United States Patent

[11] 3,620,770

[72] Inventor Robert J. Harvey
    Sudbury, Mass.
[21] Appl. No. 28,963
[22] Filed Apr. 15, 1970
[45] Patented Nov. 16, 1971
[73] Assignee Meditron, Inc.
    Wayland, Mass.

[54] COATED STRAW FOR MODIFYING SOUR TASTE
8 Claims, No Drawings

[52] U.S. Cl. ...................................................... 99/138 R,
                                                              99/171 B
[51] Int. Cl. ...................................................... A23g 3/20
[50] Field of Search ........................................... 99/138 R,
                                                              171 B

[56] References Cited
    UNITED STATES PATENTS
2,983,616  5/1961  Levi .............................  99/171 B Primary Examiner—Tim R. Miles
Attorney—Kenway, Jenney & Hildreth ABSTRACT: A coated straw useful for improving the taste of acidic liquids including carbonated beverages or fruit juices. The inside surface of the straw end inserted in the liquid is coated with a mixture of nontoxic alkaline material and sugar and a separate section of the inside surface is coated with taste-modifying stable miraculin. The amount of alkaline material is sufficient to render nonacid the liquid in the first mouthful.

COATED STRAW FOR MODIFYING SOUR TASTE

COATED STRAW FOR MODIFYING SOUR TASTE

This invention relates to a straw coated with an alkaline material and miraculin useful for modifying the taste receptors to render sour-tasting liquids sweet tasting.

Synsepalum *dulcificum* Daniell, Sapotaceae is a plane indigenous to West-Central Africa which bears a red ellipsoid fruit commonly known as "miracle fruit." The fruit has a palatable pulp and skin and contains a large seed. It is characterized by a pleasant taste and by the unique property, well recognized for over 200 years, of modifying the sweet and sour tastes in an unusual manner. It has been found that a component in the fruit depresses the sour taste and accentuates the sweet of any normally sour food eaten within a short period after first contacting the tongue with the pulp of fresh miracle fruit, thus causing the normally sour food to taste pleasantly sweet. By exposing the taste receptors on the tongue to miracle fruit, any sour-tasting food can be made to taste sweet without the addition of sugar or artificial sweeteners. For example, fresh lemon can be made to taste pleasantly sweet by first eating a miracle fruit berry. The taste-modifying principle in the miracle fruit berry known as miraculin binds itself to the taste receptors thus altering the sensory perception of the sour taste in foods eaten after the miracle fruit.

It has been determined that miraculin is a glycoprotein having a molecular weight of about 44,000. A wide variety of approaches have been explored in attempts to isolate the active component in miracle fruit for subsequent use as a taste-modifying material. These attempts have met with only limited success since the form of the product obtained by these methods is less effective than the natural fruit, and was found to be highly unstable at normal room temperatures under normal atmospheric conditions. This instability necessitated either very quick use after isolation or storage at very low temperatures or under desiccated conditions. This instability is not confined to the concentrates obtained by present processes but is also a characteristic of the fruit itself. The fruit must be consumed within a very short period after picking or it will be ineffective in modifying sour taste.

The prior art has regarded miraculin as a very labile material accounting for the observed instability of concentrates maintained at normal room temperatures. While some degree of success has been attained in improving stability of miraculin-containing material in the order of about a week or so, it has been found that stability could not be achieved when maintained in powder form at room temperatures. Alternatively, the miraculin-containing material was dissolved in specific solvents maintained at specific pH. These solutions had to be refrigerated to be preserved, and even then this material was not as effective as the natural fruit.

The miraculin is present in the pulp and on the inner surface of the skin of the miracle fruit and in its natural environment is quickly deactivated especially when exposed to the air once the skin is broken at room temperatures. Furthermore, after the fruit has been picked, even prior to breaking the skin, the active material begins to degrade but at a slower rate than when the skin is broken. While the process by which degradation proceeds is not known exactly, it is now believed that certain enzymes and/or acids present in the fruit accelerate degradation in the presence of air at normal room temperatures, and apparently even at temperatures below the freezing point of water. It has been found that when the pulp of miracle fruit is frozen and subsequently lyophilized to form a granular or powder material, the product had to be refrozen in order to maintain the activity of the material that remained. Even when the pulp had been lyophilized, its effectiveness was not nearly as great, either on a weight basis or on a quality basis, as the active principle in the fresh fruit.

A novel powdered form of the glycoprotein active principle from miracle fruit which is stable for long periods of time of a year or more at normal room condition and is method of preparation is disclosed in copending application filed concurrently herewith in the names of Robert J. Harvey and J. Richard Fennell.

The product disclosed in the copending application is a stable white powder comprising miraculin, either alone or admixed with material inert with respect to the characteristic of suppressing sour taste but excluding components that degrade miraculin present in the pulp and skin or miracle fruit including the material containing acids and/or enzymes that degrade miraculin. The product exhibits remarkable stability in powdered form at room temperature. This is indeed surprising in view of the prior art which regarded miraculin to be highly unstable and thermolabile such that it was thought necessary to maintain powdered concentrates in a frozen condition or in a dry atmosphere or to refrigerate solutions of the active principle obtained by the prior art processes to retain the desired stability over reasonably long periods of time.

The stable powdered miraculin becomes denatured when admixed with acid solutions or altered so as not to readily bond to the taste receptors. Therefore, when it is desired to improve the taste of acid solutions, such as carbonated beverages or fruit juices, with the miraculin, it is necessary that the miraculin be administered first and separate from the solution. It would be advantageous to provide a means whereby the miraculin can be administered contemporaneously with the acidic liquid to provide improved convenience without substantial miraculin degradation.

In accordance with this invention there is provided a straw coated on the inside with stable taste-modifying miraculin and a nontoxic alkaline material. The alkaline material is coated at the end of the straw inserted in the liquid to be drunk. During use, the acidic liquid first entering the straw is neutralized by the alkaline material therein. The neutralized liquid then contacts the miraculin and becomes a carrier for the miraculin to bring it into the mouth. While in the mouth, the miraculin modifies the taste receptors as described above so that subsequent acidic liquid is made to taste pleasantly sweet.

The straw can be coated in any configuration so long as the first mouthful of liquid is neutralized by the alkaline material prior to contacting the miraculin. One configuration comprises a straw coated at one end along the inside surface and coated with miraculin on the inside surface at a separate portion of the straw. Another configuration comprises coating both ends of the straw along the inside surface with alkaline material while the central portion of the inside surface is coated with miraculin. The latter configuration has the advantage of eliminating the consequence of mistakenly placing the wrong end of the straw in the acidic liquid and therefore is preferred. A third configuration comprises coating the straw with miraculin along all or a portion of its length and coating the miraculin layer with alkaline material along the entire length of the straw.

The amount of alkaline material employed is that which will neutralize substantially all the acid in solution during the first pass of liquid through the straw for the first mouthful. Thus, the length of the straw coated with alkaline material depends upon the particular alkaline material employed and the diameter of the straw. It is preferred that the straw diameter be less than about one-quarter inch to reasonably insure substantial neutralization prior to contact of solution with the miraculin. Generally, the desired effect of neutralization followed by miraculin pickup into the mouth can be effected with a straw about 8 inches or more in length.

The alkaline material can be used along or admixed with pleasant-tasting components such as sugar to reduce its salty taste and to cause the first mouthful of beverage to taste sweet since the miraculin will not have become effective at that point. Similarly, the miraculin can be admixed with small amounts of sugar for the same purpose. By including in the miraculin composition additional alkaline material the acids normally found in the mouth are neutralized and a greatly reduced amount of miraculin, in the order of about 50 percent is needed to obtain the desired taste-modifying effect. After the mouth acids have been neutralized, the miraculin is free to become bonded to the sour taste buds.

Suitable nontoxic alkaline materials that can be employed herein include magnesium carbonate, sodium bicarbonate, aluminum trisilicate, calcium carbonate, aluminum hydroxide complexes such as aluminum hydroxide magnesium carbonate codried gels, aluminum hydroxide or mixture thereof. Usually the alkaline material is employed in amounts of between 50 and 250 milligrams per straw while the micraculin is employed in amounts of between 0.1 and 200 milligrams per straw. When used, from about 1 to 10 grams of sugar are employed per straw.

While more miraculin than set forth above can be incorporated in each unit dosage from, it is unnecessary to do so in order to obtain the desired taste-modifying effect. The powdered miraculin either in the powder or in the tablet has an average particle size less than about 50–60 microns. It is preferred to minimize the average particle size of the active material since it has been found that an even greater reduction of the effective unit dose of active material is obtained thereby and the miraculin becomes fully effective in a shorter time.

Any generally employed straw materials and constructions are useful in the present invention including plastics such as polyethylene or polypropylene and wax-coated paper.

The following example illustrates the present invention and is not intended to limit the same.

EXAMPLE I

Two homogenous powdered mixtures were prepared and placed in separate containers. One mixture comprised 10 parts confectionary sugar and one part sodium bicarbonate by weight. The other mixture comprised one part stable miraculin obtained by the process of the above-cited copending application and one part of the sodium bicarbonate-sugar mixture. Coated straws were prepared by inserting a 3/32-inch rod in a 5/32-inch I.D., 8-inch wax-coated paper straw and tamping the straw into the mixture. The straw first was tamped into the bicarbonate-sugar mixture until about 40 percent of the straw was filled. The straw then was transferred to the micaculin powder (about 100 mesh size), the same straw-end down, and tamped until an additional 20 percent of the straw was filled. The straw then was transferred to the bicarbonate-sugar mixture, the same end down, and tamped to fill the remaining portion of the straw. The rod then was removed. The straw was then used to drink a flavored carbonated beverage. the taste of which was substantially improved.

I claim:

1. A straw coated on the inside with a nontoxic alkaline material and miraculin powder in a configuration so that liquid first passed into the straw first contacts the alkaline material to render it nonacidic and then contacts the miraculin to carry it into the mouth.

2. The straw of claim 1 wherein the miraculin is coated on a central portion of the inside surface and the remaining inside surface is coated with alkaline material.

3. The straw of claim 1 wherein the alkaline material is coated on one end portion and the miraculin is coated on the other end portion.

4. The straw of claim 1 having a sweetening agent admixed with the alkaline material.

5. The straw of claim 2 having a sweetening agent admixed with the alkaline material.

6. The straw of claim 3 having a sweetening agent admixed with the alkaline material.

7. The straw of claim 1 wherein the alkaline material is sodium bicarbonate.

8. The straw of claim 2 wherein the alkaline material is sodium bicarbonate.

* * * * *

UNITED STATES PATENT OFFICE
CERTIFICATE OF CORRECTION

Patent No. 3,620,770         Dated November 16, 1971

Inventor(s) Robert J. Harvey

It is certified that error appears in the above-identified patent and that said Letters Patent are hereby corrected as shown below:

Column 1, line 75, after "application" insert -- United States Serial No. 28,981 entitled "Taste-modifying Composition and Method of Preparation." --.

Signed and sealed this 7th day of November 1972.

(SEAL)
Attest:

EDWARD M. FLETCHER, JR.          ROBERT GOTTSCHALK
Attesting Officer                Commissioner of Patents